(12) United States Patent
Jeong

(10) Patent No.: US 10,164,439 B2
(45) Date of Patent: Dec. 25, 2018

(54) METAL BACK COVER WITH COMBINED WIRELESS POWER TRANSFER AND COMMUNICATIONS

(71) Applicant: QUALCOMM Incorporated, San Diego, CA (US)

(72) Inventor: Seong Heon Jeong, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 372 days.

(21) Appl. No.: 14/733,779

(22) Filed: Jun. 8, 2015

(65) Prior Publication Data

US 2016/0072303 A1    Mar. 10, 2016

Related U.S. Application Data

(60) Provisional application No. 62/046,386, filed on Sep. 5, 2014.

(51) Int. Cl.
*H02J 5/00*     (2016.01)
*H01Q 13/00*    (2006.01)
(Continued)

(52) U.S. Cl.
CPC ............ *H02J 5/005* (2013.01); *H01Q 1/24* (2013.01); *H01Q 1/243* (2013.01); *H01Q 7/00* (2013.01);
(Continued)

(58) Field of Classification Search
CPC ...................................................... H02J 5/005
See application file for complete search history.

(56) References Cited

U.S. PATENT DOCUMENTS 3,757,343 A * 9/1973 Bogner ............... H01Q 11/04
                                                                343/770
8,922,438 B2  12/2014 Nakano
(Continued)

FOREIGN PATENT DOCUMENTS

| CN | 203326731 U | 12/2013 |
| WO | 2010093969 A2 | 8/2010 |
| WO | WO-2014128339 A1 | 8/2014 |

OTHER PUBLICATIONS

International Search Report and Written Opinion—PCT/US2015/042708—ISA/EPO—dated Oct. 27, 2015.

*Primary Examiner* — Jared Fureman
*Assistant Examiner* — James Evans
(74) *Attorney, Agent, or Firm* — Knobbe, Martens, Olson & Bear, LLP

(57) ABSTRACT

Systems, apparatus and methods for seamless metal back cover for combined wireless power transfer, cellular, WiFi, and GPS communications are provided. In one aspect, an apparatus for wirelessly coupling with other devices comprises a metallic cover comprising a first metallic portion separated by a first non-conductive portion from a second metallic portion of the metallic portion to define a first slot. The apparatus further comprises a conductor comprising a first end portion electrically coupled to the metallic cover at the first metallic portion and a second end portion crossing the first end portion and electrically coupled to the metallic cover at the second metallic portion. The metallic cover and the conductor form a coupler configured to wirelessly receive power sufficient to charge or power a load of the apparatus from a wireless power transmitter.

16 Claims, 10 Drawing Sheets

(51) Int. Cl.
*H04B 1/38* (2015.01)
*H01Q 13/10* (2006.01)
*H04B 5/00* (2006.01)
*H02J 50/10* (2016.01)
*H02J 50/12* (2016.01)
*H01Q 1/24* (2006.01)
*H02J 7/00* (2006.01)
*H02J 7/02* (2016.01)
*H01Q 7/00* (2006.01)
*H04B 1/3888* (2015.01)

(52) U.S. Cl.
CPC ............ *H01Q 13/00* (2013.01); *H01Q 13/10* (2013.01); *H02J 7/0042* (2013.01); *H02J 7/025* (2013.01); *H04B 1/38* (2013.01); *H04B 5/0037* (2013.01); *H04B 1/3888* (2013.01)

(56) References Cited

U.S. PATENT DOCUMENTS

| | | |
|---|---|---|
| 9,240,824 B2 | 1/2016 | Hillan et al. |
| 2004/0257283 A1 | 12/2004 | Asano et al. |
| 2009/0033289 A1* | 2/2009 | Xing ................... H02J 7/0065 320/140 |
| 2011/0062793 A1 | 3/2011 | Azancot et al. |
| 2011/0133995 A1 | 6/2011 | Pascolini et al. |
| 2011/0254741 A1* | 10/2011 | Ishimiya ................ H01Q 1/243 343/702 |
| 2013/0009833 A1 | 1/2013 | Kough et al. |
| 2013/0135158 A1 | 5/2013 | Faraone et al. |
| 2014/0125528 A1 | 5/2014 | Tsai et al. |
| 2014/0132462 A1 | 5/2014 | Ying |
| 2014/0247188 A1 | 9/2014 | Nakano et al. |
| 2015/0380827 A1 | 12/2015 | Tahtinen |
| 2016/0006293 A1 | 1/2016 | Jeong et al. |

* cited by examiner

METAL BACK COVER WITH COMBINED WIRELESS POWER TRANSFER AND COMMUNICATIONS

CLAIM OF PRIORITY UNDER 35 U.S.C. § 119

The present application for patent claims priority to Provisional Application No. 62/046,386 entitled "SYSTEMS, METHODS AND APPARATUS FOR SEAMLESS METAL BACK COVER FOR COMBINED WIRELESS POWER TRANSFER, CELLULAR, WIFI AND GLOBAL POSITIONING SYSTEM COMMUNICATIONS" filed Sep. 5, 2014, and assigned to the assignee hereof. Provisional Application No. 62/046,386 is hereby expressly incorporated by reference herein.

FIELD

Certain aspects of the present disclosure generally relate to wireless communications, and more particularly, to systems, apparatus and methods for a seamless metal back cover for combined wireless power transfer, cellular, WiFi, and global positioning system (GPS) communications.

BACKGROUND

Designs for mobile communication devices may include a metal back cover. Wireless power charging systems may provide the ability to charge and/or power electronic devices without physical, electrical connections, thus reducing the number of components required for operation of the electronic devices and simplifying the use of the electronic device. As it is desirable to incorporate wireless power circuitry into various portable electronic devices, systems, apparatus and methods for combined wireless power transfer, cellular, WiFi, and GPS communications in a device with a metal back cover are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for wirelessly coupling with other devices. The apparatus includes a metallic cover including a first metallic portion separated by a first non-conductive portion from a second metallic portion of the metallic cover to define a first slot. The apparatus further includes a conductor comprising a first end portion electrically coupled to the metallic cover at the first metallic portion and a second end portion crossing the first end portion and electrically coupled to the metallic cover at the second metallic portion. The metallic cover and the conductor form a coupler configured to wirelessly receive power sufficient to charge or power a load of the apparatus from a wireless power transmitter.

Another aspect of the disclosure provides a method for wirelessly coupling an electronic device with other devices. The method includes wirelessly receiving power sufficient to charge or power a load of the electronic device via a coupler comprising a metallic cover having a first metallic portion separated by a first non-conductive portion from a second metallic portion to define a first slot and a conductor. The conductor includes a first end portion electrically coupled to the metallic cover at the first metallic portion. The conductor includes a second end portion crossing the first end portion and electrically coupled to the metallic cover at the second metallic portion. The method further includes wirelessly receiving communications data via an antenna comprising at least a portion of the metallic cover and at least a portion of the conductor.

Another aspect of the disclosure provides an apparatus for wirelessly coupling power via a magnetic field generated by a transmitter. The apparatus includes a metallic portion configured to form a portion of a housing. The apparatus further includes a conductor having at least one turn and having a portion electrically separated from the metallic portion to form a gap between the conductor and the metallic portion, the conductor configured to inductively couple power via the magnetic field and provide electrical current to a receive circuit to charge or power a load of the apparatus. A first slot antenna is formed based on the gap between the conductor and the metallic portion.

Another aspect of the disclosure provides an apparatus for wirelessly coupling with other devices. The apparatus includes electrically conductive means for encasing a portion of the apparatus, the electrically conductive means including a first metallic portion separated by a first non-conductive portion from a second metallic portion of the electrically conductive means to define a first slot. The apparatus further comprises means for conductive electrical current comprising a first end portion electrically coupled to the electrically conductive means at the first metallic portion and a second end portion crossing the first end portion and electrically coupled to the electrically conductive means at the second metallic portion. The electrically conductive means and the means for conducting electrical current forming means for wirelessly receiving power sufficient to charge or power a load of the apparatus from a wireless power transmitter.

Another aspect of the disclosure provides an apparatus for wirelessly coupling power via a magnetic field generated by a transmitter. The apparatus includes electrically conductive means for housing one or more device electronics. The apparatus further includes means for conducting electrical current having at least one turn and having a portion electrically separated from the electrically conductive means to form a gap between the means for conducting electrical current and the electrically conductive means, the means for conducting electrical current configured to inductively couple power via the magnetic field and provide electrical current to a receive circuit to charge or power a load. A means for wirelessly receiving communications formed based on the gap between the means for conducting electrical current and electrically conductive means.

DETAILED DESCRIPTION

Figure 1:
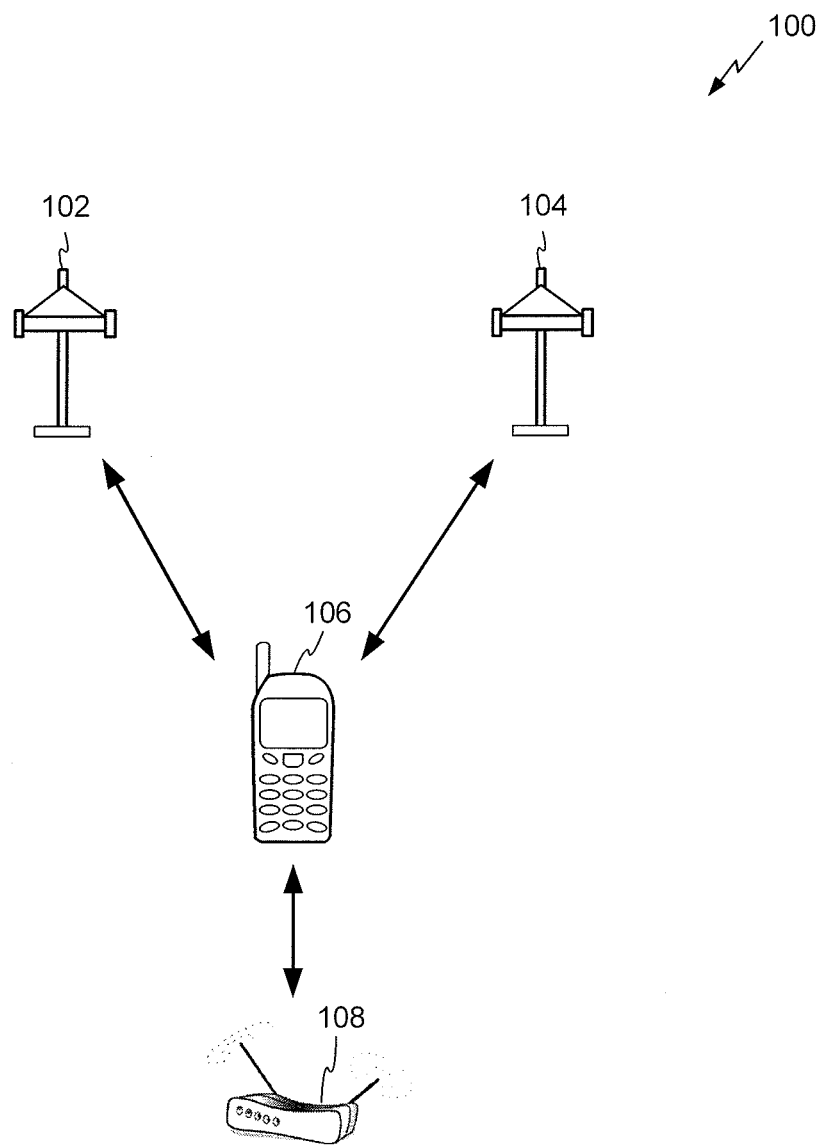
FIG. 1 illustrates an example of a communication system in which aspects of the present disclosure may be employed.

Various aspects of the novel systems, apparatuses, and methods are described more fully hereinafter with reference to the accompanying drawings. The teachings of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, access networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless access network technologies may include various types of wireless local area access networks (WLANs) or wide area networks (WANs). The various aspects described herein may apply to any communication standard, such as any member of the IEEE 802.11 family of wireless protocols (e.g., Wi-Fi), cellular communications (e.g., long term evolution (LTE), wireless code division multiple access (WCDMA), global system for mobile communications (GSM)), global positioning systems (GPS), and the like.

In some implementations, a WLAN or WAN includes various devices which are the components that access the wireless access network. The techniques described herein may be used for various broadband wireless communication systems. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth.

FIG. 1 illustrates an example of a communication system in which aspects of the present disclosure may be employed. At least a portion of the communication system 100 may operate pursuant to a wireless standard (e.g., 4G LTE, WCDMA, GSM, WiFi, or GPS). The communication system 100 may include a base station 102, a base station 104, a mobile device 106 and a WiFi-enabled device 108. The base station 102 may be configured to provide cellular network access to the mobile device 106 (e.g., one or more of WCDMA, GSM and/or LTE cellular network access). The base station 104 may be configured to provide GPS access to the mobile device 106. The WiFi-enabled device 108 may provide WLAN connectivity to the mobile device 106 (e.g., WiFi connectivity). As will be described in more detail in connection with FIGS. 2-12 below, the mobile device 106 may comprise a single-piece metal back cover configurable as a coupler for wireless power transfer to the mobile device 106, and further configured as a plurality of antennas for providing communication according to a plurality of communication protocols (e.g., LTE, WCDMA, GSM, WiFi and GPS).

Figure 2:
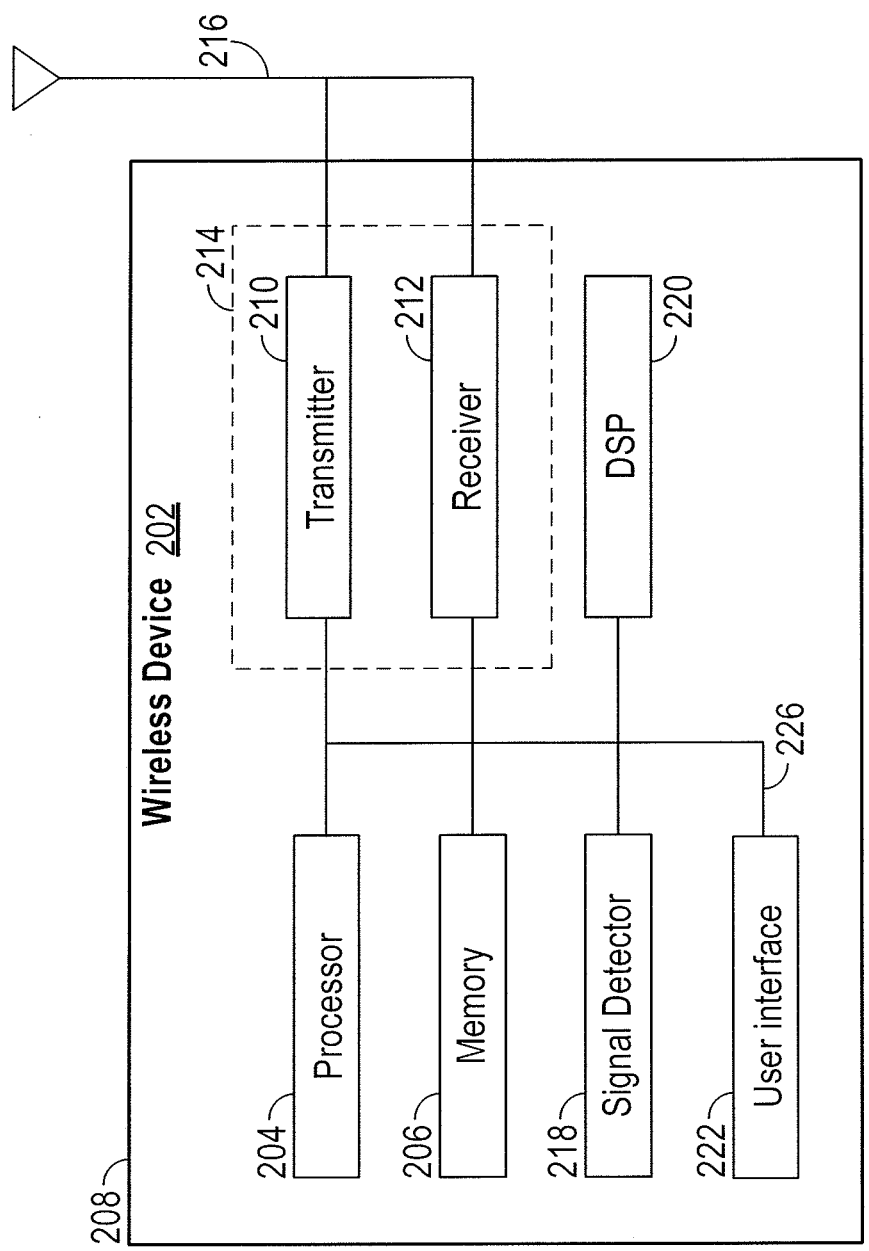
FIG. 2 illustrates various components that may be utilized in a device that may be employed within the communication system of FIG. 1.

FIG. 2 illustrates various components that may be utilized in a device that may be employed within the communication system of FIG. 1. The device 202 may be a wireless device for example, but the present application is not so limited. The device 202 is an example of a device that may be configured to implement the various methods described herein. The device 202 may comprise the mobile device 106 of FIG. 1.

The device 202 may include a processor 204 which controls operation of the device 202. The processor 204 may also be referred to as a central processing unit (CPU) or hardware processor. Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. Thus, where one or more operations are performed by the processor 204, the operations may be performed by a single processor 204, or alternatively a subset of the operations may each be performed by respective separate processors, which in combination form the processor 204. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include transitory or non-transitory computer-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The device 202 may also include a housing 208 that may include a transmitter 210 and a receiver 212 to allow transmission and reception of data between the device 202 and a remote location. The transmitter 210 and receiver 212 may be combined into a transceiver 214. An antenna 216 may be attached to the housing 208 and electrically coupled to the transceiver 214. In some implementations, the antenna 216 may comprise a plurality of antennas formed as a portion of a metal back cover of the device 202 and configured as both a coupler for receiving wireless power from a wireless charger, as well as antennas for communicating according to each of a plurality of communication protocols (e.g., LTE, WCDMA, GSM, WiFi and GPS). Such a metal back cover may be a back cover that physically couples to or forms the back of the device 202 (e.g., a cell-phone or a tablet). The metal back cover may be configured to protect the internal components of the device 202 from exposure or damage. The metal back cover may be mostly metal (e.g., aluminum or copper) but may have other non-metal components as well for various purposes (e.g., holding various portions together or covering ports when not in use).

The device 202 may also include a signal detector 218 that may be used in an effort to detect and quantify the level of signals received by the transceiver 214. The signal detector 218 may detect such signals as total energy, energy per subcarrier per symbol, power spectral density and other signals. The device 202 may also include a digital signal processor (DSP) 220 for use in processing signals. The DSP 220 may be configured to generate a data unit for transmission.

The device 202 may further comprise a user interface 222 in some aspects. The user interface 222 may comprise a keypad, a microphone, a speaker, and/or a display. The user interface 222 may include any element or component that conveys information to a user of the device 202 and/or receives input from the user.

The various components of the device 202 may be coupled together by a bus system 226. The bus system 226 may include a data bus, for example, as well as a power bus, a control signal bus, and a status signal bus in addition to the data bus. Those of skill in the art will appreciate the components of the device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore the device 202 may be at least one of a cellular phone, a GPS unit, a watch, a mobile media device, a laptop computer, a key fob, or the like.

Figure 3:
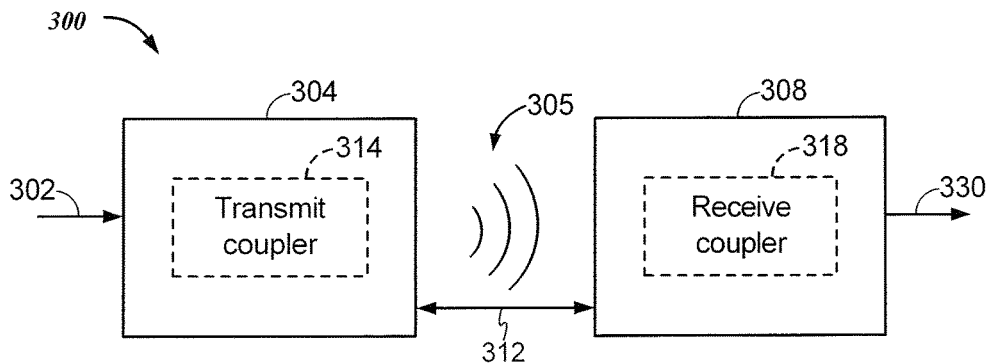
FIG. 3 is a functional block diagram of a wireless power transfer system, in accordance with an exemplary implementation.

FIG. 3 is a functional block diagram of a wireless power transfer system 300, in accordance with an exemplary implementation. Input power 302 may be provided to a transmit coupler 314 of a transmitter 304 from a power source (not shown) to generate a wireless (e.g., magnetic or electromagnetic) field 305 for performing energy or power transfer. The wireless field 305 corresponds to a region where energy output by the transmitter 304 may be captured by a receiver 308. A receive coupler 318 (e.g., a receive coupler 318) of the receiver 308 may couple to the wireless field 305 and may generate output power 330 for storing or consumption by a device (not shown) coupled to the output power 330. Both the transmitter 304 and the receiver 308 may be separated by a distance 312.

In one exemplary implementation, power is transferred inductively via a time-varying magnetic field generated by the transmit coupler 314. The transmit coupler 314 and the receive coupler 318 may be configured according to a mutual resonant relationship. When the resonant frequency of the receive coupler 318 and the resonant frequency of the transmit coupler 314 are substantially the same, or very close, transmission losses between the transmitter 304 and the receiver 308 are minimal. Resonant inductive coupling techniques may thus allow for improved efficiency and power transfer over various distances and with a variety of coupler configurations.

In some implementations, the wireless field 305 corresponds to the "near-field" of the transmitter 304. The "near-field" may correspond to a region in which there are strong reactive fields resulting from the currents and charges in the transmit coupler 314 that minimally radiate power away from the transmit coupler 314, rather than radiating electromagnetic energy away into free space. The "near-field" may correspond to a region that is within about one wavelength (or a fraction thereof) of the transmit coupler 314.

Efficient energy transfer may occur by coupling a large portion of the energy in the wireless field 305 to the receive coupler 318 rather than propagating most of the energy in an electromagnetic wave to the far field. When positioned within the wireless field 305, a "coupling mode" may be developed between the transmit coupler 314 and the receive coupler 318.

Figure 4:
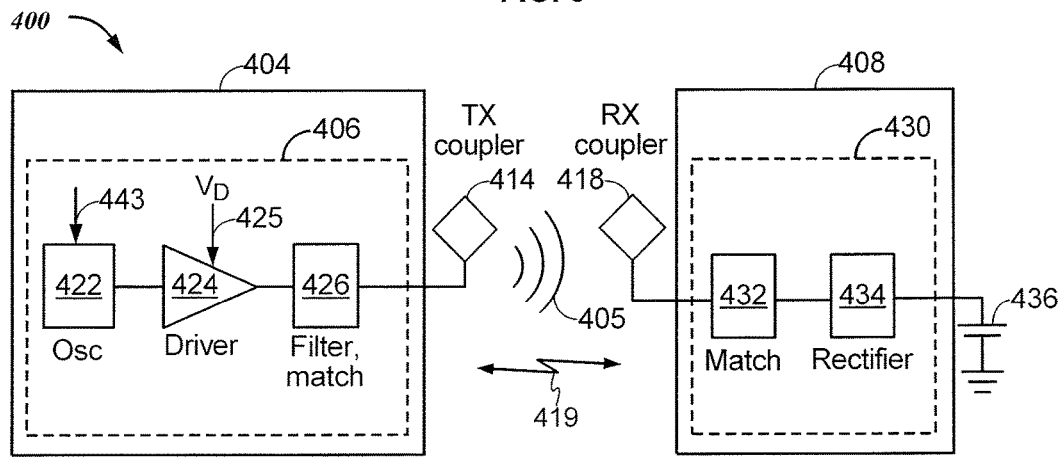
FIG. 4 is a functional block diagram of a wireless power transfer system, in accordance with another exemplary implementation.

FIG. 4 is a functional block diagram of a wireless power transfer system 400, in accordance with some other exemplary implementation. The system 400 includes a transmitter 404 and a receiver 408. The transmitter 404 includes transmit circuitry 406 that includes an oscillator 422, a driver circuit 424, and a filter and matching circuit 426. The oscillator 422 is configured to generate a signal at a desired frequency that may be adjusted in response to a frequency control signal 443. The oscillator 422 provides the oscillator signal to the driver circuit 424. The driver circuit 424 is configured to drive the transmit coupler 414 at, for example, a resonant frequency of the transmit coupler 414 based on an input voltage signal ($V_D$) 425. The filter and matching circuit 426 filters out harmonics or other unwanted frequencies and may also match the impedance of the transmit circuitry 406 to the impedance of the transmit coupler 414 for maximal power transfer. The driver circuit 424 drives a current through the transmit coupler 414 to generate a wireless field 405 for wirelessly outputting power at a level sufficient for charging a battery 436.

The receiver 408 comprises receive circuitry 430 that includes a matching circuit 432 and a rectifier circuit 434. The matching circuit 432 may match the impedance of the receive circuitry 430 to the impedance of the receive coupler 418. The rectifier circuit 434 may generate a direct current (DC) power output from an alternate current (AC) power input to charge the battery 436. The receiver 408 and the transmitter 404 may additionally communicate on a separate communication channel 419 (e.g., Bluetooth, Zigbee, cellular, etc). The receiver 408 and the transmitter 404 may alternatively communicate via band signaling using characteristics of the wireless field 405. The receiver 408 may be configured to determine whether an amount of power transmitted by the transmitter 404 and received by the receiver 408 is appropriate for charging the battery 436.

Figure 5:
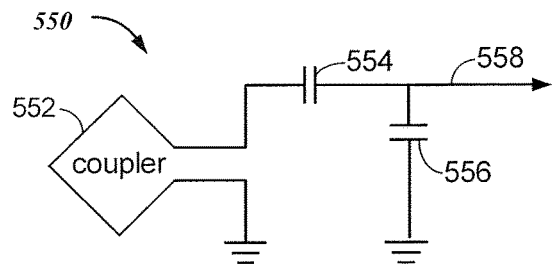
FIG. 5 is a schematic diagram of a portion of the transmit circuit or the receive circuit of FIG. 4 including a transmit coupler or a receive coupler, in accordance with an exemplary implementation.

FIG. 5 is a schematic diagram of a portion of the transmit circuitry 406 or the receive circuitry 430 of FIG. 4, in accordance with some exemplary embodiments. As illustrated in FIG. 5, transmit or receive circuitry 550 may include a coupler 552. The coupler 552 may also be referred to or be configured as a "conductor loop", a coil, an inductor, or as a "magnetic" coupler. The term "coupler" generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 552, whereas, capacitance may be added via a capacitor (or the self-capacitance of the coupler 552) to create a resonant structure at a desired resonant frequency. As a non-limiting example, a capacitor 554 and a capacitor 556 may be added to the transmit or receive circuitry 550 to create a resonant circuit that resonates at a resonant frequency. For larger sized couplers using large diameter coils exhibiting larger inductance, the value of capacitance needed to produce resonance may be lower. Furthermore, as the size of the coupler increases, coupling efficiency may increase. This is mainly true if the size of both base and electric vehicle couplers increase. For transmit couplers, the signal 558, with a frequency that substantially corresponds to the resonant frequency of the coupler 552, may be an input to the coupler 552. For receive couplers, the signal 558 may be the output from the coupler 552.

As previously described, designs for mobile communication devices may include a metal back cover. In some cases, the metal back cover can include several separate, electrically isolated metallic portions, which reduce robustness of the back cover and increase difficulty of integrated antenna design. This may also limit antenna topologies usable with such covers. The present disclosure is related to implementations for integrating a coupler (e.g., coupler 552) and other communication antennas into a design for a mobile communication device with a metal back cover. Certain aspects of implementations described herein may allow for reducing the number of separate segments in a metal back cover to allow for increased robustness and integrated antenna design.

Figure 6:
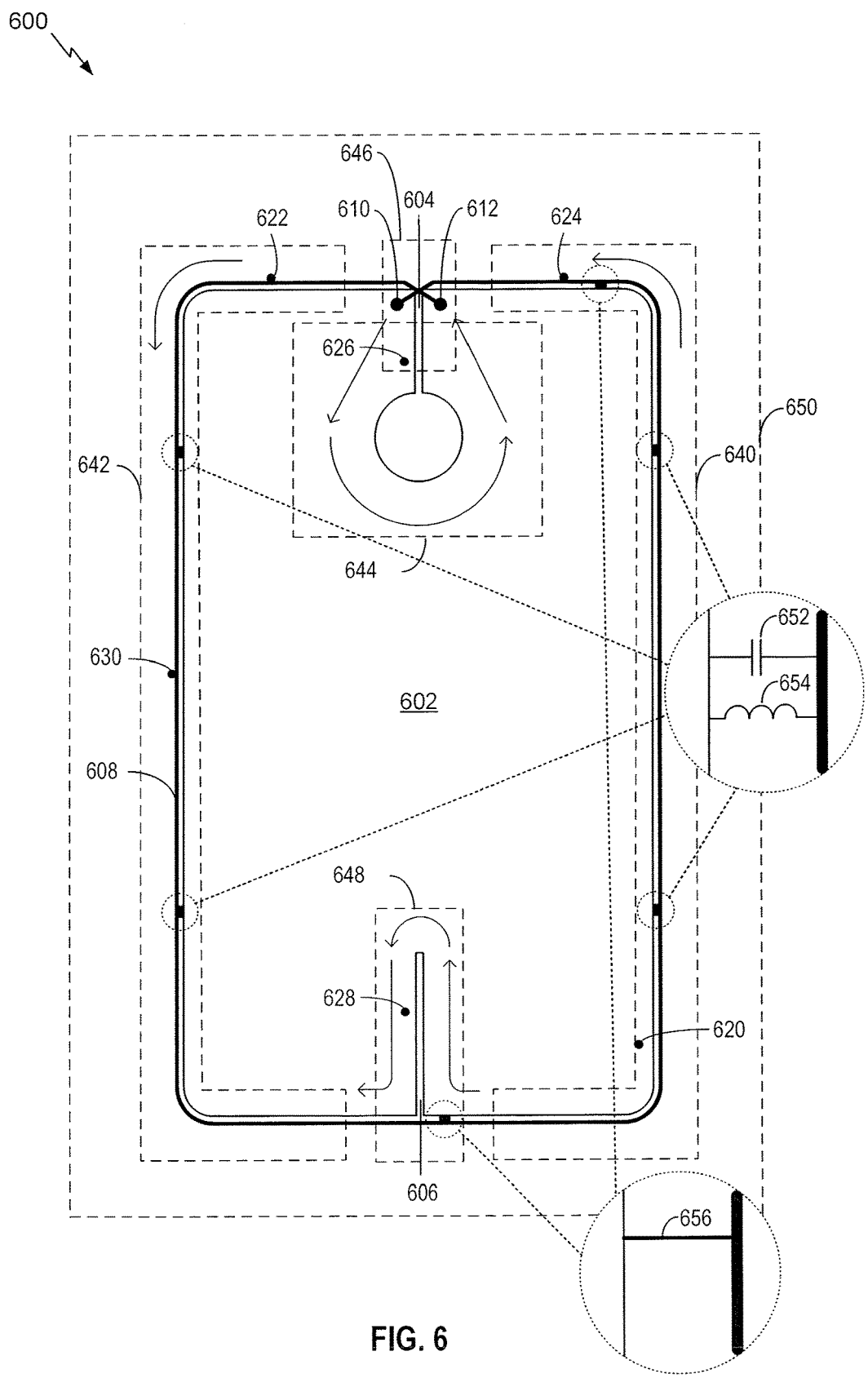
FIG. 6 illustrates a top view of a metallic back cover for the device of FIG. 2, in accordance with some implementations.

FIG. 6 illustrates a top view 600 of a metallic back cover 602 for the device 202 of FIG. 2, in accordance with some implementations. The metallic back cover 602 (e.g., a substantially single-piece metallic section) may comprise a first slot 604 (e.g., a first non-conductive portion) and a second slot 606 (e.g., a second non-conductive portion). Stated another way, the metallic back cover 602 may be shape, cut or formed in a way such that a first slot 604 is formed in a first portion and a second slot 606 is formed in a second, different, portion of the metallic back cover 602. The first slot 604 may be disposed on a top portion of the metallic back cover 602 and may extend from a top edge (e.g., a middle of the top edge) of the metallic back cover 602 toward a center portion of the metallic back cover 602. Likewise, the second slot 606 may be disposed on a bottom portion of the metallic back cover 602 and may extend from a bottom edge (e.g., a middle of the bottom edge) of the metallic back cover 602 toward the center portion of the metallic back cover 602. In some implementations, the metallic back cover 602 may not include the second slot 606. In some implementations, the metallic back cover 602 may be a single metallic piece rather than a plurality of electrically (e.g., galvanically) isolated pieces. The use of a substantially unitary metallic piece for the metallic back cover 602 may simplify the wireless power transfer coupler and other included antenna designs as well as reduce the risk of fabrication waste. The metallic back cover 602 may additionally comprise a conductor 608 (e.g., a wire) having a first end portion 610 and a second end portion 612. In some implementations, the conductor 608 may be an electrically conductive wire, separate and apart from the metallic back cover 602. In some other implementations, the conductor 608 may be machined from the metallic back cover 602 in the form of a conductor, wire or trace. In some implementations, the conductor 608 may have multiple turns. The first end portion 610 is electrically connected to the metallic back cover 602 adjacent to a first side of the first slot 604, while the second end portion 612 is electrically connected to the metallic back cover 602 adjacent to a second side of the first slot 604 opposite the first side. Accordingly, as shown in FIG. 6, the conductor 608 may be wrapped around an outer perimeter of, and connected in criss-cross with, the metallic back cover 602. In some other implementations, the conductor 608 is not criss-crossed with the metallic back cover 602 and instead the connection points of the first end portion 610 and the second end portion 612 are reversed from that shown in FIG. 6. Thus, the combination of the metallic back cover 602 and the conductor 608 form both an antenna and a wireless power receiving coupler having at least a single turn. In one aspect, the combination of the metallic back cover 602 and the conductor 608 may form at least two turns of a coupler for wirelessly receiving power. In some other implementations, the conductor 608 is wrapped completely around the metallic back cover 602 once and wrapped around a portion of the metallic back cover 602 once more, providing another turn mid-metallic back cover.

The first slot 604 and the second slot 606 reduce eddy currents which may be induced in the metallic back cover 602 by currents flowing through the conductor 608 as well as by internal and/or external magnetic and/or electromagnetic fields penetrating the metallic back cover 602, e.g., during wireless power transfer. As shown in FIG. 6, a current flowing through the conductor 608 in the direction of the arrows may flow into the metallic back cover 602 from the first end portion 610, counter clockwise around the first slot 604 and back into the second end portion 612 of the conductor 608. The location of the first slot 604 with respect to the first and second ends 610/612 of the conductor 608 causes the current to flow around the first slot 604. This effectively provides a second turn (in addition to the turn provided by the conductor 608) for induced currents to circulate. Thus, the currents travel a farther distance through the metallic back cover 602 than if the first slot 604 were absent. This increases the inductance and reduces the current induced by a given inducing electromotive force (EMF) during wireless power transfer.

Likewise, the second slot 606 increases the distance eddy currents travel near the bottom of the metallic back cover 602 as shown by the arrows flowing counterclockwise around the second slot 606. This further increases inductance and also reduces eddy currents. Moreover, the presence of the first and second slots 604/606 force the eddy currents to flow in a first direction (e.g., an upwards direction as shown in FIG. 6) on one side of the slots and in a substantially opposite direction (e.g., a downwards direction as shown in FIG. 6) on the other side of the slots. This detouring path for the eddy current may be in opposite directions on each side of the second slot 606 in the metallic back cover 602 and thus, a cancellation effect may occur. This effect may further reduce induced eddy currents in the conductor 608 since the currents in the metallic back cover 602 near the second slot 606 are spread out in order to travel around the second slot 606. This further reduces the electromagnetic damping effect of the eddy currents since any magnetic or electromagnetic fields caused by the eddy currents flowing on one side of the slots will substantially cancel magnetic or electromagnetic fields caused by the eddy currents flowing on the other side of the slots. In addition, the criss-crossed connection points for the first and second end portions 610/612 of the conductor 608 being adjacent to the first slot 604 ensure the eddy currents flow in the same circular direction through both the metallic back cover 602 and the conductor 608 (e.g., clockwise or counterclockwise depending on the angle and sign of the inducing EMF). This increases a self-inductance of each of the metallic cover 602 and the conductor 608 and the mutual inductance (M) between the metallic cover 602 and the conductor 608. Table 1 below illustrates an equivalent resistance (R), inductance (L), Maximum mutual inductance (Max M) and Minimum mutual inductance (Min M) of the combination of the metallic cover 602 and the conductor 608. The values in Table 1 are non-limiting and are shown for purposes of illustration only.

TABLE 1

| | R (Ω) | L (nH) | Max M (nH) | Min M (nH) |
|---|---|---|---|---|
| 1-turn wire | 0.5 | 345 | 169 | 121 |
| 1-turn wire + 1-turn mid plate | 0.65 | 406 | 213 | 169 |
| 1-turn wire + 1-turn mid plate + bottom slot | 0.59 | 417 | 240 | 189 |

The metallic back cover 602 and connected conductor 608 may form or comprise a plurality of slot, planar inverted-F (PIFFA), monopole, dipole or loop antennas (e.g., each substantially located within or defined by a respective one of the dotted lined boxes shown in FIG. 6). Each slot antenna may be fed or tapped at a respective one of a plurality of feed locations on one or both of the metallic back cover 602 and the conductor 608. Each of the slot antennas may operate within at least one of a plurality of different frequency bands corresponding to a respective one of a plurality of different wireless communication protocols. For example, a first slot antenna 640 (e.g., a main cellular antenna) may be defined by the portions of the metallic back cover 602 and the conductor 608 enclosed within the associated dotted line. A gap between the metallic back cover 602 and the conductor 608 forms a slot for the first slot antenna 640. In some implementations, the first slot antenna 640 may have a feed point 620 for extracting or for providing a signal to the first slot antenna 640. In some implementations, the feed point 620 may be electrically connected to the metallic back cover 602 at the feed point 620. In some other implementations, the feed point 620 may be electrically connected to both the metallic back cover 602 and the conductor 608 at the feed point 620. The first slot antenna 640 may operate within at least one of a first or second frequency range (e.g., at least one of a first low band frequency range of approximately 704-960 MHz and a second high band frequency range of approximately 1700-2700 MHz) which may provide for communication according to one or more of LTE, WCDMA, CDMA and GSM protocols, for example.

A second slot antenna 642 (e.g., a diversity cellular antenna) may be defined by the portions of the metallic back cover 602 and the conductor 608 substantially enclosed within the associated dotted line. A gap between the metallic back cover 602 and the conductor 608 forms a slot for the second slot antenna 642. In some implementations, the second slot antenna 642 may have a feed point 622 for extracting a signal from or for providing a signal to the second slot antenna 642. In some implementations, the feed point 622 may be electrically connected to the conductor 608 at the feed point 622. In some other implementations, the feed point 622 may be electrically connected to both the metallic back cover 602 and the conductor 608 at the feed point 622. The second slot antenna 642 may operate within at least the first frequency range (e.g., at least one of the low band frequency range of approximately 704-960 MHz and the high band frequency range of approximately 1700-2700 MHz) which may provide for communication according to one or more of LTE, WCDMA, CDMA and GSM protocols. In some implementations, the second slot antenna 642 may be located on a side of the metallic back cover 602 opposite the first slot antenna 640.

A third slot antenna 644 (e.g., a GPS antenna) may be defined by the portions of the metallic back cover 602 and the conductor 608 substantially enclosed within the associated dotted line. A gap between the metallic back cover 602 and the conductor 608 forms a slot for the third slot antenna 644. In some implementations, the third slot antenna 644 may have a feed point 624 for extracting or for providing a signal to the third slot antenna 644. In some implementations, the feed point 624 may be electrically connected to the conductor 608 or metal back cover 602 at the feed point 624. In some other implementations, the feed point 624 may be electrically connected to both the metallic back cover 602 and the conductor 608 at the feed point 624. The third slot antenna 644 may operate within a third frequency range (e.g., approximately 1.575 GHz) which may provide for communication according to GPS protocols, for example.

A fourth slot antenna 646 (e.g., a WiFi antenna) may be defined by the portions of the metallic back cover 602 and the conductor 608 substantially enclosed within the associated dotted line. A gap between the metallic back cover 602 and the conductor 608 forms a slot for the fourth slot antenna 646. In some implementations, the fourth slot antenna 646 may have a feed point 626 for extracting or for providing a signal to the fourth slot antenna 646. In some implementations, the feed point 626 may be electrically connected to the metallic back cover 602 at a point adjacent to one side of the first slot 604. In some other implementations, the feed point 626 may be electrically connected to the metallic back cover 602 at points adjacent to both sides of the first slot 604. The fourth slot antenna 646 may operate within a fourth frequency range (e.g., 2.4-2.48 GHz) which may provide for communication according to WiFi protocols, for example.

A fifth slot antenna 648 (e.g., another main antenna) may be defined by the portions of the metallic back cover 602 and the conductor 608 substantially enclosed within the associated dotted line. A gap between the metallic back cover 602 and the conductor 608 forms a slot for the fifth slot antenna 648. In some implementations, the fifth slot antenna 648 may have a feed point 628 for extracting or for providing a signal to the fifth slot antenna 648. In some implementations, the feed point 628 may be electrically connected to the metallic back cover 602 at a point adjacent to one side of the second slot 606. In some other implementations, the feed point 628 may be electrically connected to the metallic back cover 602 at points adjacent to both sides of the second slot 606. The fifth slot antenna 648 may operate within the second frequency range (e.g., the high band frequency range of approximately 1700-2700 MHz) which may provide for communication according to one or more of LTE, WCDMA, CDMA and GSM protocols, for example. Although particular antennas are described above to function according to particular communication protocols or at particular frequencies, the present application is not so limited and any antenna may operate according to any communication protocol and/or at any particular frequency.

Substantially the metallic back cover 602 and the conductor 608 may also comprise a coupler 650 for wireless power transfer, as previously described in connection with FIGS. 3-5. In FIG. 6, the coupler 650 may effectively provide one, two, or three "turns:" one from the conductor 608, another from the top slot defined in the metal back cover 602 and criss-crossing conductor 608 connection, and yet another from the bottom slot 606. In some implementations, the coupler 650 may have a feed point 630 for extracting wireless power from a separate near field wireless power transmitter. The feed point 630 may be electrically connected to the conductor 608. The coupler 650 may operate within a fifth frequency range (e.g., approximately 6.78 MHz) which may provide for reception of wireless power according to one or more wireless charging protocols.

In some implementations, one or more reactive components may be electrically connected between the metallic back cover 602 and the conductor 608 to aid in forming the slot antennas. For example, as shown in FIG. 6, a capacitor 652 and/or an inductor 654 may be connected in series with one another between the cover 602 and the conductor 608 (arrangement not shown in FIG. 6), or alternatively, the capacitor 652 and the inductor 654 may be connected in shunt (parallel) with one another between the cover 602 and the conductor 608. The reactive components may be located in one or more of a plurality of positions around the perimeter of the cover 602. In some implementations, the values of the capacitor 652 and/or the inductor 654 may be chosen such that at least the capacitor 652 provides a very low impedance (e.g., an effective short circuit) path between the cover 602 and the conductor 608 at the frequencies associated with transmission and reception of communications data (e.g., LTE, WCDMA, GPS, WIFI), and such that at least the capacitor 652 provides a very high impedance (e.g., an effective open circuit) path between the cover 602 and the conductor 608 at the frequencies associated with near-field resonant wireless power transmission (e.g., 6.78 MHz). In this way, wireless charging may not be affected by the presence of the capacitor 652 and/or the inductor 654, while communications data antennas work properly. In some other implementations, one or more capacitors (not shown in FIG. 6) may be connected to the cover 602 to provide a ground connection at a predetermined frequency or frequencies.

In yet other implementations, the metallic back cover 602 and the conductor 608 may be short-circuited to one another to aid in forming the slot antennas. For example, as shown in FIG. 6, a conductor 656 may be connected between the cover 602 and the conductor 608. In some implementations, a first conductor 656 may connect the cover 602 and the conductor 608 near the second slot 606, while a second conductor 656 may connect the cover 602 and the conductor 608 near the first and second end portions 610 and 612 of the conductor 608.

Figure 7:
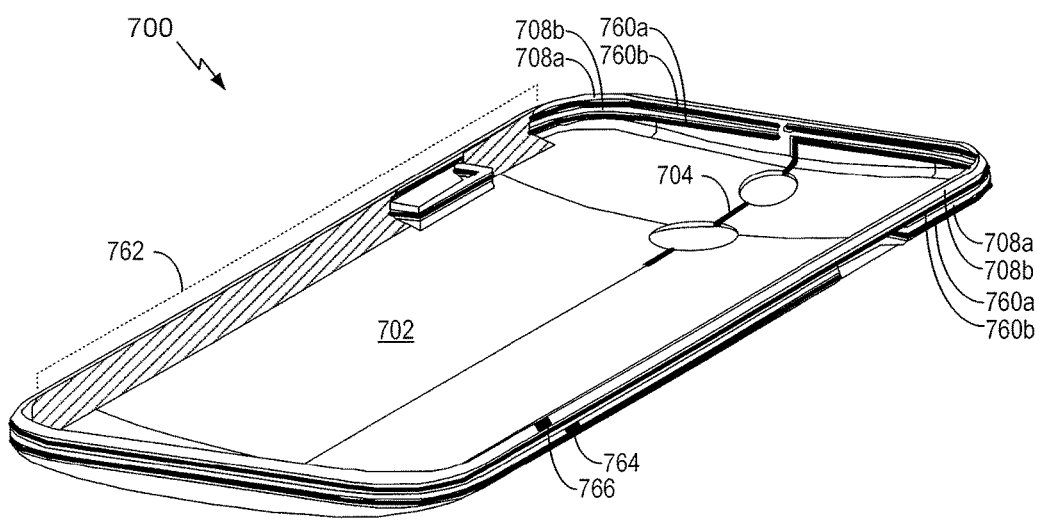
FIG. 7 illustrates an isometric view of another metallic back cover for the device of FIG. 2, in accordance with some other implementations.

FIG. 7 illustrates an isometric view 700 of a metallic back cover 702 for the device of FIG. 2, in accordance with some other implementations. The metallic back cover 702 (e.g., a single-piece metallic section) may comprise at least a first slot 704 disposed on a top portion of the metallic back cover 702 and may extend from a top edge (e.g., a middle of the top edge) of the metallic back cover 702 toward a center portion of the metallic back cover 702. The metallic back cover 702 may be a single metallic piece rather than a plurality of electrically (e.g., galvanically) isolated pieces. In some implementations, the metallic back cover 702 may be machined such that a conductor along the outer perimeter of the metallic back cover 702 has two turns 708a and 708b. Each of the two turns 708a and 708b may be separated from one another and from the metallic back cover 702 by a non-conductive molding (e.g., plastic molding) 760a and 760b. The two turns 708a and 708b of the conductor may be connected to one another at one location to form a single coil having a first end portion and a second end portion as previously described in connection with FIG. 6. Accordingly, the turns 708a/708b of the conductor may be wrapped around an outer perimeter of, and connected in criss-cross with, the metallic back cover 702. In some other implementations, the turns 708a/708b are not criss-crossed with the metallic back cover 702. As with the implementation of FIG. 6, the combination of the metallic back cover 702 and the turns 708a/708b of the conductor may form both an antenna and a wireless power receiving coupler.

As shown in FIG. 7, a ferrite structure 762 may be attached to the turns 708a/708b in order to isolate the turns 708a/708b from metallic objects or components within the device. In some implementations, another ferrite structure (not shown) may be attached to the turns 708a/708b on the opposite edge of the back cover 702.

In some implementations according to FIG. 7, the turns 708a/708b may form a loop antenna for communication according to one or more of LTE, WCDMA, CDMA and GSM protocols. In such implementations, the turns 708a/708b may also have a ground connection to a metal chassis of the device. Furthermore, in addition to having one or more inductors, capacitors or switches connected in shunt between the turns 708a/708b and the metallic back cover 702, as previously described in connection with FIG. 6, the turns 708a/708b may have chokes 764 and 766 (e.g., inductors, capacitors or switches) connected in series with one or both of the turns 708a/708b. Such chokes may substantially open-circuit the turns 708a/708b as communication antennas when operating in the operating bands of the particular communication protocol (LTE, WCDMA, CDMA and GSM) and substantially short-circuit the turns 708a/708b at wireless power transfer frequencies (e.g., 6.75 MHz).

In some implementations, the metallic back cover 602/702 may also be known as metallic means for covering the apparatus (e.g., the mobile device 106). In some implementations, the conductor 608/708a/b may also be known as means for conducting a current along an outer perimeter of the metallic covering means (e.g., the metallic back cover 602/702).

Figure 8:
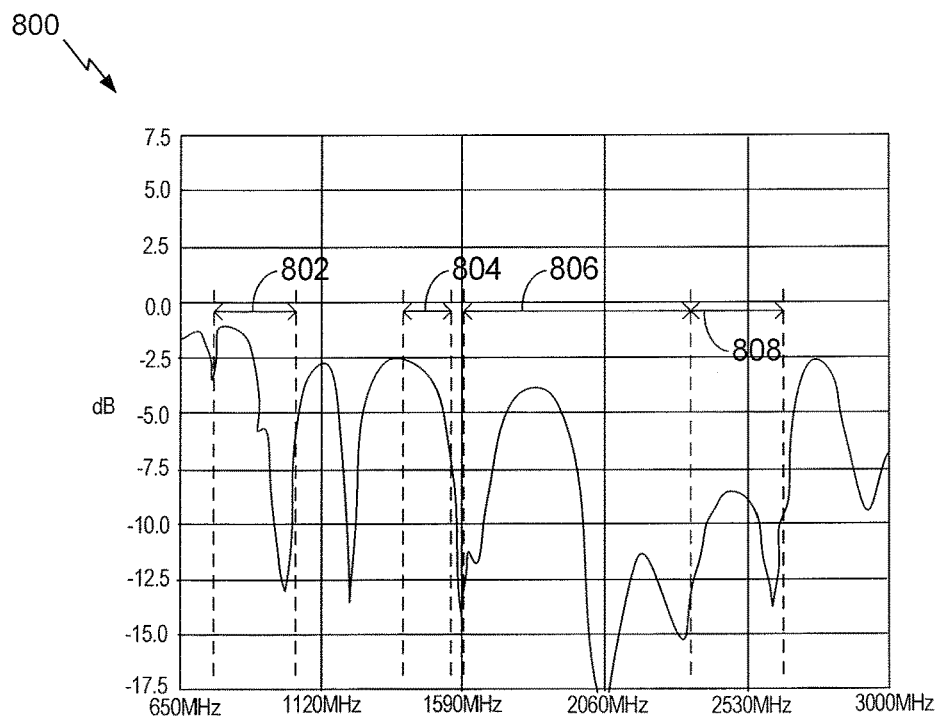
FIG. 8 is a graph depicting a frequency response of the metallic cover and wire of FIG. 6 without the first or second slots, in accordance with some implementations.

FIG. 8 is a graph 800 depicting an exemplary frequency response of the metallic cover 602 and conductor 608 of FIG. 6 without the first 604 or second 606 slots, in accordance with some implementations. Although particular values are described herein, they are only exemplary and any other values may be achieved based on a particular implementation. The vertical axis illustrates the response amplitude in decibels (dB), while the horizontal axis illustrates frequency in Hertz (Hz). As shown in FIG. 8, the frequency response spans each of a first frequency range 802, a second frequency range 804, a third frequency range 806 and a fourth frequency range 808. The first frequency range 802 may correspond to the first frequency band (e.g., approximately 704-960 MHz for low band LTE, WCDMA and GSM communication protocols) as previously described in connection with FIG. 6. The second frequency range 804 may correspond to the third frequency range as previously described in connection with FIG. 6 (e.g., approximately 1.575 GHz for GPS communication protocols). The third frequency range 806 may correspond to the second frequency range (e.g., approximately 1700-2700 MHz for high band LTE, WCDMA and GSM communication protocols) as previously described in connection with FIG. 6. The fourth frequency range 808 may correspond to the fourth frequency range (e.g., approximately 2.4-2.48 GHz for WiFi communication protocols) as previously described in connection with FIG. 6. The graph 800 showing the frequency response may be utilized for comparing responses where the metallic cover 602 has one or more of the slots previously described in connection with FIG. 6.

Figure 9:
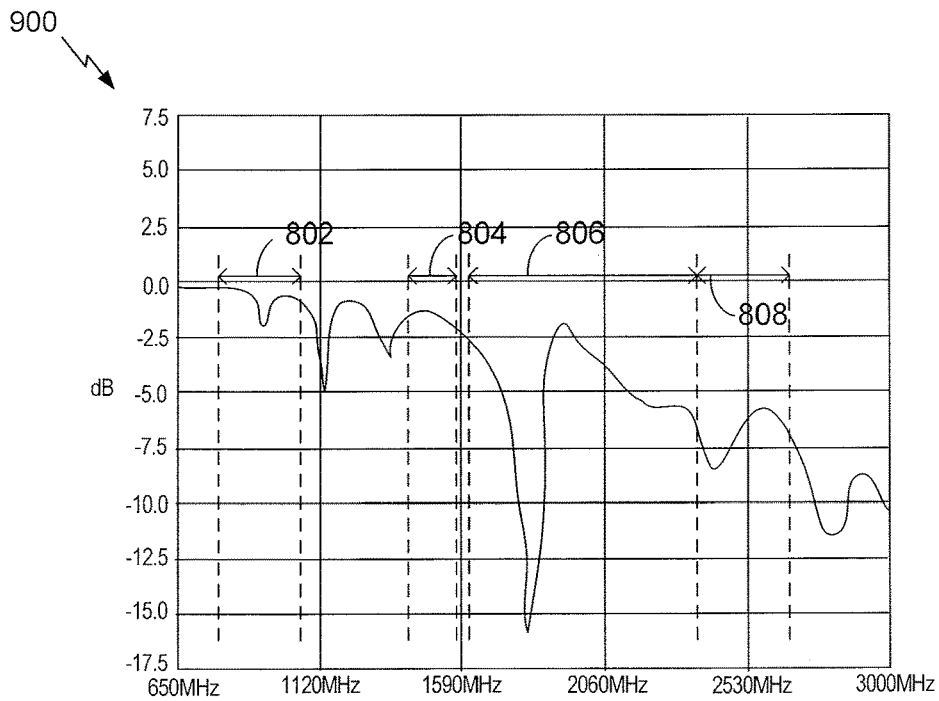
FIG. 9 is a graph depicting a frequency response of the metallic cover and wire of FIG. 6 including the second slot, in accordance with some other implementations.

FIG. 9 is a graph 900 depicting a frequency response of the metallic cover 602 and conductor 608 of FIG. 6 including the second slot 606, in accordance with some other implementations. The vertical axis illustrates the response amplitude in decibels (dB), while the horizontal axis illustrates frequency in Hertz (Hz). As shown in FIG. 9, the frequency response spans each of the first through fourth frequency ranges 802-808 as previously described in connection with FIG. 8. As compared to the frequency response shown in FIG. 8, the inclusion of a slot into the metallic back cover 602 improves the response at nearly all frequencies, and especially dramatically between 1.7 and 5 GHz.

Figure 10:
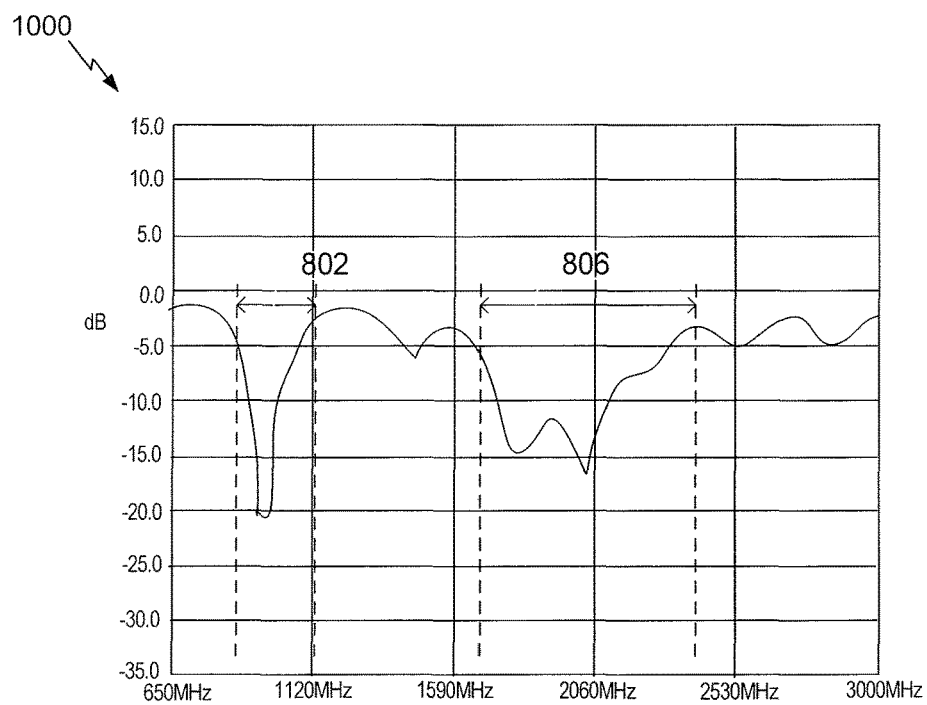
FIG. 10 is a graph depicting a frequency response of the metallic cover and wire of FIG. 6 including the first and second slots, in accordance with yet other implementations.

FIG. 10 is a graph 1000 depicting a frequency response of the metallic cover 602 and conductor 608 of FIG. 6 including the first and second slots 604 and 606, in accordance with yet other implementations. The vertical axis illustrates the response amplitude in decibels (dB), while the horizontal axis illustrates frequency in Hertz (Hz). As shown in FIG. 10, the first frequency range 802 and third frequency range 806 (e.g., approximately 704-960 MHz for low band and approximately 1700-2700 MHz for high band LTE, WCDMA and GSM communication protocols), as previously described in connection with FIG. 8, are overlaid on the frequency response curve. As compared to the frequency response shown in FIG. 8, the inclusion of the first 604 and second 606 slots into the metallic back cover 602 improves the frequency response in the third frequency range 806.

Figure 11:
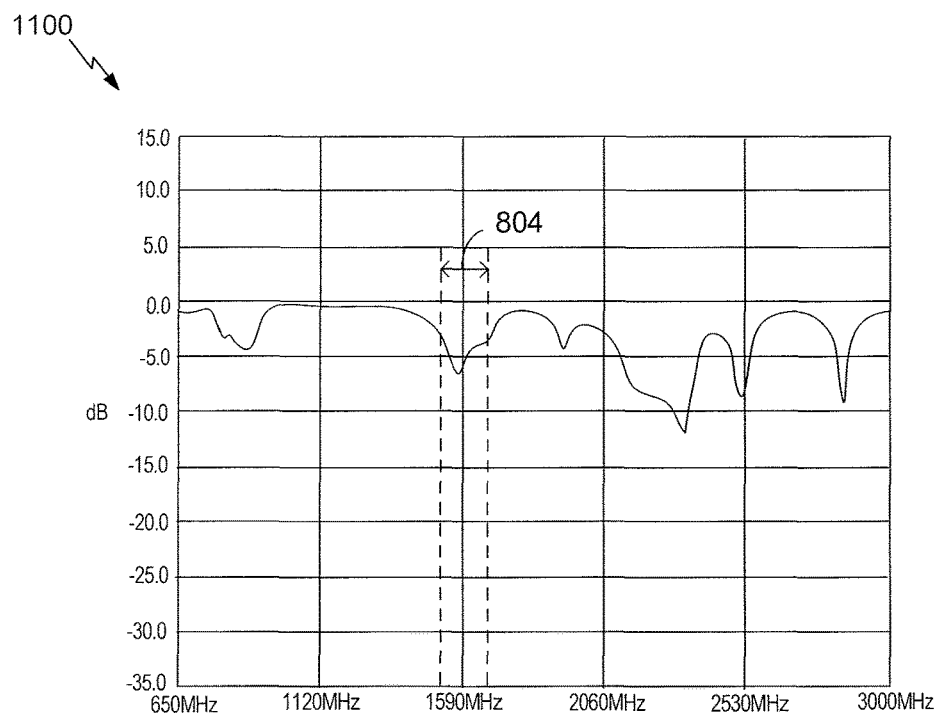
FIG. 11 is a graph depicting another frequency response of the metallic cover and wire of FIG. 6 including the first and second slots, in accordance with yet other implementations.

FIG. 11 is a graph 1100 depicting a frequency response of the metallic cover 602 and conductor 608 of FIG. 6 including the first and second slots 604 and 606, in accordance with yet other implementations. The vertical axis illustrates the response amplitude in decibels (dB), while the horizontal axis illustrates frequency in Hertz (Hz). As shown in FIG. 11, the second frequency range 804 (e.g., approximately 1.575 GHz for GPS communication protocols), as previously described in connection with FIG. 8, is overlaid on the frequency response curve. As compared to the frequency response shown in FIG. 8, the inclusion of the first 604 and second 606 slots into the metallic back cover 602 improves the frequency response in the second frequency range 804.

Figure 12:
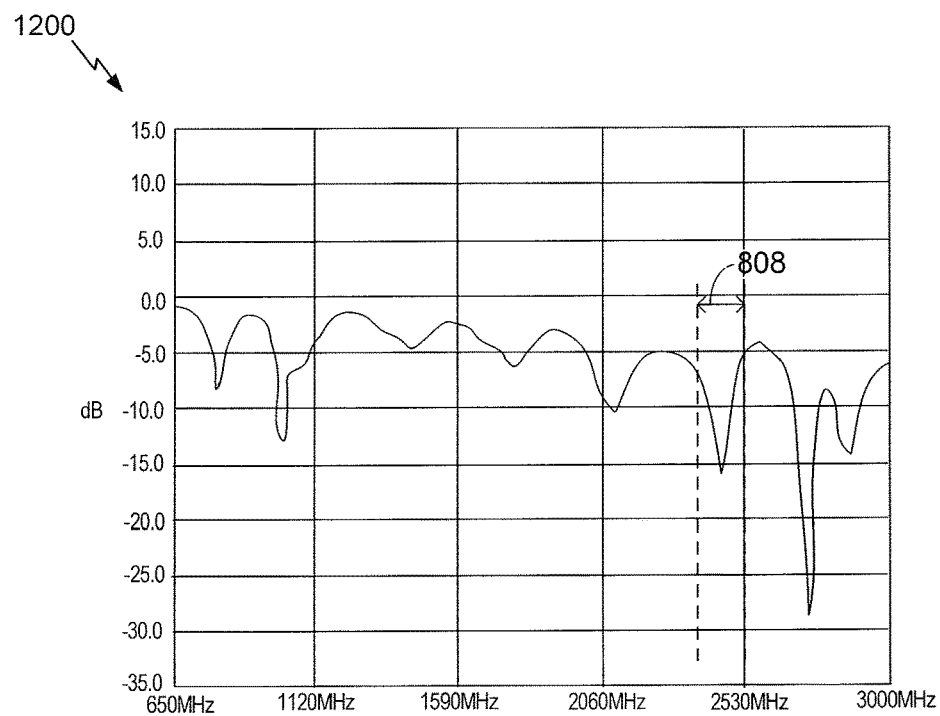
FIG. 12 is a graph depicting another frequency response of the metallic cover and wire of FIG. 6 including the first and second slots, in accordance with yet other implementations.

FIG. 12 is a graph 1200 depicting a frequency response of the metallic cover 602 and conductor 608 of FIG. 6 including the first 604 and second 606 slots, in accordance with yet other implementations. The vertical axis illustrates the response amplitude in decibels (dB), while the horizontal axis illustrates frequency in Hertz (Hz). As shown in FIG. 12, the fourth frequency range 808 (e.g., approximately 2.4-2.48 GHz for WiFi communication protocols), as previously described in connection with FIG. 8, is overlaid on the frequency response curve. As compared to the frequency response shown in FIG. 8, the inclusion of the first 604 and second 606 slots into the metallic back cover 602 may smooth the frequency response in the fourth frequency range 808.

Figure 13:
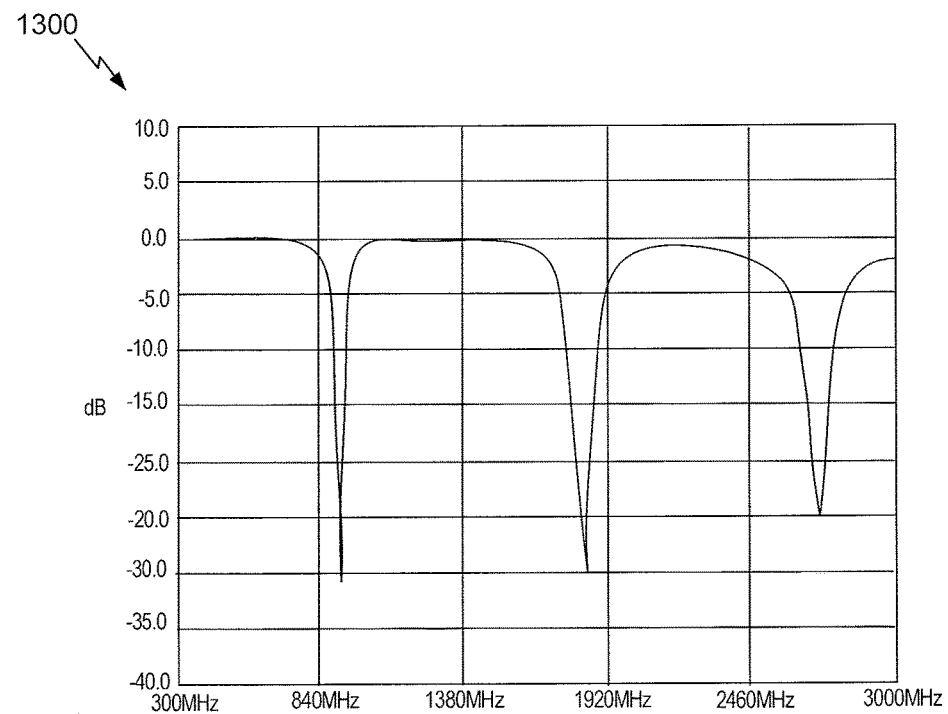
FIG. 13 is a graph depicting another frequency response of the metallic cover and wire of FIG. 6 including the first and second slots and the short-circuit conductors, in accordance with yet other implementations.

FIG. 13 is a graph 1300 depicting a frequency response of the metallic cover 602 and conductor 608 of FIG. 6 including the first 604 and second 606 slots and the short-circuit conductors 656, in accordance with yet other implementations. The vertical axis illustrates the response amplitude in decibels (dB), while the horizontal axis illustrates frequency in Hertz (Hz). As shown in FIG. 13, the inclusion of the short-circuit conductors 656 between the metallic back cover 602 and the conductor 608 may smooth the frequency response as well as provide attenuation in the frequency response in bands including and surrounding approximately 900 MHz, 1800 MHz and 2700 MHz.

Figure 14:
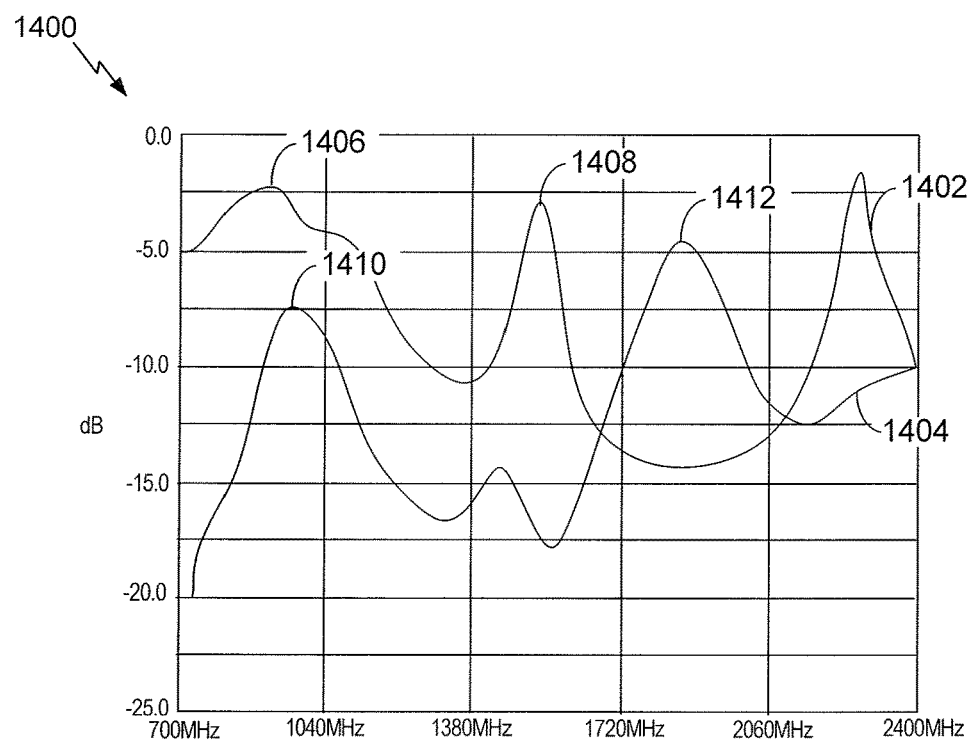
FIG. 14 is a graph depicting a frequency response curve of the metallic cover and wire of FIG. 6 operating as a slot antenna compared to a frequency response curve of the metallic cover and turns of FIG. 7 operating as a loop antenna, in accordance with some implementations.

FIG. 14 is a graph 1400 depicting a frequency response curve 1402 of the metallic cover 602 and conductor 608 of FIG. 6 operating as a slot antenna compared to a frequency response curve 1404 of the metallic cover 702 and turns 708a/708b of FIG. 7 operating as a loop antenna, in accordance with some implementations. The vertical axis illustrates the response amplitude in decibels (dB), while the horizontal axis illustrates frequency in Hertz (Hz). As shown, the frequency response curve 1402 corresponding to FIG. 7 has a low band peak 1406 of approximately −2.1 dB and a high band peak 1408 of approximately −2.7 dB. Moreover, the frequency response curve 1404 corresponding to FIG. 6 has a low band peak of 1410 of approximately −7.1 dB and a high band peak 1412 of approximately −4.7 dB.

Figure 15:
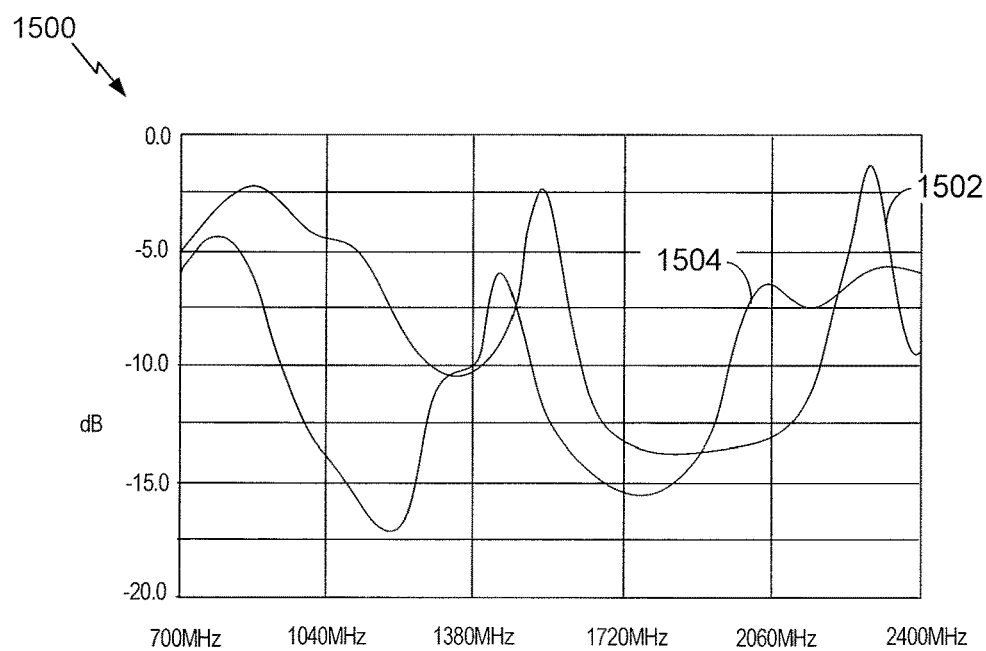
FIG. 15 is a graph depicting a frequency response curve of the metallic cover and turns of FIG. 7 when not attached to a device as compared to a frequency response curve of the metallic cover and turns of FIG. 7 when attached to the device, in accordance with some implementations.

FIG. 15 is a graph 1500 depicting a frequency response curve 1502 of the metallic cover 702 and turns 708a/708b of FIG. 7 when not attached to a device as compared to a frequency response curve 1504 of the metallic cover 702 and turns 708a/708b of FIG. 7 when attached to the device, in accordance with some implementations. The vertical axis illustrates the response amplitude in decibels (dB), while the horizontal axis illustrates frequency in Hertz (Hz). As shown, the frequency response curve 1502 corresponds to the metallic cover 702 and turns 708a/708b of FIG. 7 when not attached to a device (e.g., a hand-held cellular smartphone), while the frequency response curve 1504 corresponds to the metallic cover 702 and turns 708a/708b of FIG. 7 when attached to the device. As can shown, the frequency response is higher when the metallic cover is not attached to the device as compared to when the metallic cover is attached to the device for all illustrated frequencies with the exception of two bands that span from approximately 1200 MHz to 1500 MHz and from approximately 1900 MHz to 2200 MHz.

Figure 16:
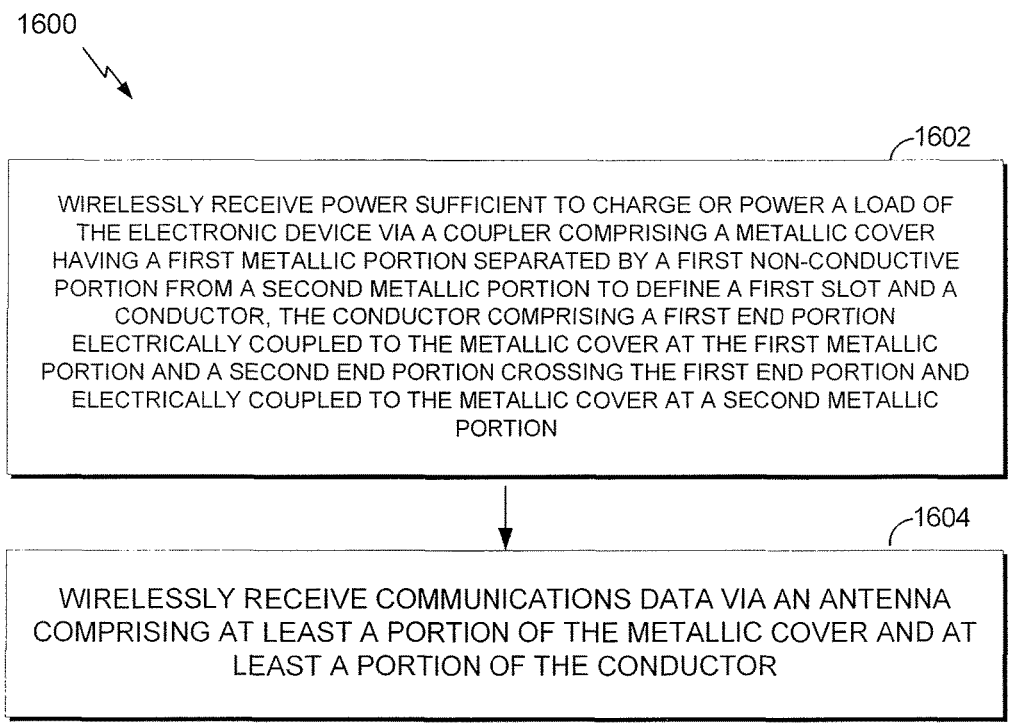
FIG. 16 is a flow chart for a method for coupling with other devices, in accordance with some implementations.

FIG. 16 is a flowchart 1600 for a method for coupling with other devices, in accordance with some implementations. In some implementations, one or more of the operations in flowchart 1600 may be performed by, or in connection with, a processor, although those having ordinary skill in the art will appreciate that other components may be used to implement one or more of the steps described herein. Although blocks may be described as occurring in a certain order, the blocks can be reordered, blocks can be omitted, and/or additional blocks can be added.

The flowchart 1600 may begin with block 1602, which includes wirelessly receiving power sufficient to charge or power a load of the electronic device via a coupler comprising a metallic cover having a first metallic portion separated by a first non-conductive portion from a second metallic portion to define a first slot and a conductor. For example, as previously described in connection with FIGS. 6 and/or 7, the coupler may comprise both the cover 602/702 having the first slot 604/704 and the conductor 608/708a/b. The conductor 608/708a/b comprises a first end portion 610 electrically coupled to the metallic cover 602/702 at the first metallic portion and a second end portion 612 crossing the first end portion 610 and electrically coupled to the metallic cover 602/702 at a second metallic portion.

The flowchart 1600 may continue with block 1604, which includes wirelessly receiving communications data via an antenna comprising at least a portion of the metallic cover and at least a portion of the conductor. For example, as previously described in connection with FIGS. 6 and/or 7, any of the slot antennas 640, 642, 644, 646 and 648 (not expressly illustrated in FIG. 7, though contemplated by the present application) may each comprise at least a respective portion of the metallic cover 602/702 and the conductor 608/708a/b, and may be configured to receive communications data within their respective frequency bands, as previously described.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. An apparatus for wirelessly coupling with other devices, comprising:
    a metallic cover comprising a first metallic portion separated by a first non-conductive portion from a second metallic portion of the metallic cover to define a first slot;
    a conductor comprising a first end portion electrically coupled to the metallic cover at the first metallic portion and a second end portion crossing the first end portion and electrically coupled to the metallic cover at the second metallic portion,
    wherein the metallic cover and the conductor form a coupler configured to wirelessly receive power sufficient to charge or power a load of the apparatus from a wireless power transmitter; and
    a rectifier circuit electrically connected to the coupler and configured to deliver power to the load based on the wirelessly received power,
    wherein the conductor is disposed around an outer perimeter of the metallic cover.

2. The apparatus of claim 1, wherein the metallic cover further comprises a third metallic portion separated by a second non-conductive portion from a fourth metallic portion of the metallic cover to define a second slot.

3. The apparatus of claim 2, wherein the first non-conductive portion is defined on a first edge of the metallic cover and extends toward a center of the metallic cover and wherein the second non-conductive portion is defined on a second edge of the metallic cover opposite the first edge and extends toward the center of the metallic cover.

4. The apparatus of claim 2, wherein the first metallic portion, the first non-conductive portion and the second metallic portion form a first slot antenna and the third metallic portion, the second non-conductive portion and the fourth metallic portion form a second slot antenna.

5. The apparatus of claim 2, wherein the coupler comprises:
    a first turn formed by the conductor;
    a second turn formed by the first end portion electrically coupled to the metallic cover at the first metallic portion and the second end portion crossing the first end portion and electrically coupled to the metallic cover at the second metallic portion; and
    a third turn formed by the third metallic portion and the fourth metallic portion separated by the second non-conductive portion.

6. The apparatus of claim 1, wherein each of a plurality of portions of the metallic cover and the conductor comprise a respective one of a plurality of antennas configured to wirelessly receive data in a plurality of frequency bands.

7. The apparatus of claim 6, further comprising at least one capacitor electrically connected between the metallic cover and the conductor, the at least one capacitor configured to:
    provide substantially a short circuit between the metallic cover and the conductor when at least one of the plurality of antennas receives data in the plurality of frequency bands, and
    provide substantially an open circuit between the metallic cover and the conductor when the coupler wirelessly receives power from the wireless power transmitter at a wireless power transmission frequency.

8. The apparatus of claim 6, further comprising a plurality of feed points configured to extract one or both of the wirelessly received power and the wirelessly received data, each feed point electrically connected to a respective location on one or both of the metallic cover and the conductor.

9. The apparatus of claim 1, wherein at least one slot antenna is formed from an edge of the metallic cover, a portion of the conductor, and a gap separating the edge of the metallic cover from the portion of the conductor.

10. The apparatus of claim 1, wherein a current induced in one or both of the metallic cover and the conductor flows in a same clockwise or counterclockwise direction in the metallic cover and in the conductor.

11. The apparatus of claim 1, wherein the first non-conductive portion causes eddy currents induced in the metallic cover to flow around the first non-conductive portion.

12. The apparatus of claim 1, further comprising a resonant circuit comprising the conductor and a capacitor electrically coupled to the conductor, the resonant circuit configured to resonate at a wireless power transfer frequency.

13. The apparatus of claim 1, wherein the apparatus comprises at least one of a cellular phone, a UPS unit, a watch, a mobile media device, a laptop computer, or a key fob.

14. The apparatus of claim 1, further comprising a housing coupled to the metallic cover.

15. The apparatus of claim 1, wherein the metallic cover is configured as a metallic back cover of a portable electronic device.

16. The apparatus of claim 1, wherein the conductor comprises first and second turns disposed along the outer perimeter of the metallic cover and a choke is electrically connected in series with at least one of the first and second turns to:
  provide a substantially open circuit in the at least one of the first and second turns when at least one of a plurality of slot antennas receives data in one of a plurality of frequency bands, the plurality of slot antennas formed based on a separation between the conductor and the metallic cover, and
  provide substantially a short circuit in the at least one of the first and second turns when the coupler wirelessly receives power from the wireless power transmitter at a wireless power transmission frequency.

* * * * *